United States Patent [19]

Fuchs et al.

[11] Patent Number: 4,883,324
[45] Date of Patent: Nov. 28, 1989

[54] SUPPORT BLOCK FOR TRACK ADJUSTMENT WHEELS

[75] Inventors: Willi Fuchs, Hennef; Werner Kermelk, Much, both of Fed. Rep. of Germany

[73] Assignee: Lemmerz-werke KGaA, Koenigswinter, Fed. Rep. of Germany

[21] Appl. No.: 345,295

[22] Filed: May 1, 1989

[30] Foreign Application Priority Data

Jun. 25, 1988 [DE] Fed. Rep. of Germany ....... 3821533

[51] Int. Cl.$^4$ ............................................ B60B 23/12
[52] U.S. Cl. ................................ 301/9 TV; 301/11 R
[58] Field of Search ..................... 301/62, 63 R, 63 D, 301/10 R, 10 DC, 11 R, 9 R, 9 DN

[56] References Cited

U.S. PATENT DOCUMENTS 2,171,170 8/1939 Beckman .......................... 301/11 R

FOREIGN PATENT DOCUMENTS 0025677 3/1881 European Pat. Off. ......... 301/9 TV

Primary Examiner—Russell D. Stormer
Attorney, Agent, or Firm—Body, Vickers & Daniels

[57] ABSTRACT

A wheel comprises a felloe or outer rim, a dish for attachment to a vehicle hub and several improved support blocks connecting the dish to the rim. The improved support blocks have a generally U-shaped profile which has one configuration in the central portion of the support block and a second configuration at its ends. The leg portions of the central profile are straight and joined to the base of the U by small radius curves. The leg and base portions of the end profile are gently curved and unfavorable stresses avoided.

17 Claims, 3 Drawing Sheets

SUPPORT BLOCK FOR TRACK ADJUSTMENT WHEELS

FIELD OF THE INVENTION

The invention relates to a support block for track adjustment wheels, comprising a somewhat U-shaped piece which is connectable, preferably by a welded joint, to the track adjustment felloe in the region of the free ends of its two profile members arranged on the profile bar.

DESCRIPTION OF THE PRIOR ART

As is known, track adjustment wheels are used for adjusting the track width, particularly on agricultural tractors and other vehicles for agricultural and forestry use. The customary track adjustment wheels exhibit wheel dishes which are attachable to the track adjustment felloe in different axial positions by means of screw bolts. The felloes are provided with a plurality of welded support blocks arranged round their inner circumference, to which the multi-tabbed wheel dishes are attached.

Numerous constructions have been proposed and used in the past for the small support blocks which serve for the screw fastening of the track adjustment felloe, including angle-shaped or S-shaped support blocks, so-called omega blocks or also somewhat U-shaped support blocks. The known support blocks are connected to the track adjustment felloe by riveting, spot welding, but generally by means of axial weld seams or by means of weld seams extending in the circumferential direction of the felloe, but also occasionally by means of a combination of both weld seams (German Patent Specification No. 837,649, British Patent Specification No. 666,112, German Patent Specification No. 2,247,007, German Utility Model 7,605,257, European Patent Specification No. 0,025,677, German patent application P No. 3,741,640, German Utility Model 1,835,325, German Utility Model 843,932).

SUMMARY OF THE INVENTION

The invention starts from the support blocks which are basically and at least approximately U-shaped, which are connected to the track adjustment felloe with their profile aperture facing the latter, preferably by means of weld seams extending in the circumferential direction of the felloe. The object of the invention is primarily to construct said support blocks with high component strength, so that even under very high operating loads no harmful concentrations of stress can occur in the particularly threatened end regions of the support block, and here above all in the region of the radii of curvature of the profile members at the transition to the profile bar, which may lead to deformations and possibly even to a fracture of the support blocks under severe operating conditions.

The above-stated object is achieved according to the invention when the profile bar exhibits in the two end regions of the support block an arching towards the outside of the profile having an inner radius of curvature between the profile bar and profile members which is greater than the radius of curvature between profile bar and profile members in the intermediate section of the support block between its two end regions. The end regions of the support block, which is of somewhat U-shaped construction, are preferably formed so that the two profile members are drawn inwards into the inner space of the profile here in the transition region to the outwardly arched profile bar compared to their position in the intermediate section of the support block.

The configuration of the U-shaped support block according to the invention succeeds in preventing harmful concentrations of stress in the particularly threatened end regions of the support block and in creating a support block with greater tensile strength without excessive production outlay. Increasing the radii of curvature at the transitions between the profile members and the profile bar of the U-shaped profile in the end regions of the support block creates favourable conditions of contact with regard to strength between the latter and the wheel dish tabs. Particularly, it can thus be achieved that no contact with the wheel dish tabs exists in the end regions of the support block, it being restricted instead to the inner length section of the support block, where large area contact by the wheel dish tab against the profile member of the support block exists.

The forming of the end regions of the support block according to the invention is conveniently effected in that the radius of curvature between the profile bar and the profile members increases steadily from the transition to the above-mentioned intermediate section of the support block towards the relevant end of the latter. The arrangement may be made so that the inner radius of curvature at the ends of the support block is at least approximately four to six times greater than on the said intermediate section. The radius of curvature at the ends of the support block may be, as a rough approximation, approximately equal to half the inside profile width of the U-shaped profile. This means that the centre of the radius of curvature (or of both radii of curvature) of the profile bar and of the transition regions to the two profile members is located in the central axis of the U-shaped profile or only slightly offset laterally from the latter. The length of the arched end regions is generally approximately 10–20% of the total length of the support block, measured along its profile bar.

The profile bar is conveniently constructed as a flat bar on the said intermediate section. The profile members, which are placed at right angles to the flat bar, then merge into the profile bar with small inner radii of curvature which may be of the order of magnitude of approximately 4–7 mm. The two profile members should be arranged slightly inclined on the said intermediate section, so that the angle which they enclose with the profile bar is approximately 0.1°–0.5° greater than 90°. This results in more favourable load conditions under axial forces at the profile radii which are stressed in flexure.

The detachable connection of the track adjustment felloe to the wheel dish is conveniently effected by means of screw bolts. In this case the holes for the screw bolts are conveniently arranged on the profile members outside the formed end regions. The connection to the wheel dish at each support block may be effected by means of a single screw bolt or also by means of two or more screw bolts. The configuration of the support block according to the invention as a double support block, which can be attached to the associated wheel dish tabs by means of two screw bolts, is particularly advantageous. The bolt holes on the two profile members may be arranged so that their hole axes are located approximately level with the centres of curvature of the end formed parts of the support block.

The two profile members of the support block according to the invention are conveniently provided with outward facing flanges, by which they may be connected to the track adjustment felloe by means of weld seams extending in the circumferential direction. The support block according to the invention is also preferably produced as a one-part sheet metal pressing.

The invention also embraces a track adjustment felloe which is equipped for fastening to the wheel dish by the support blocks according to the invention. In this case the arrangement is made according to the invention so that the support blocks are braced laterally by their profile members in the axial direction of the felloe against a formed part of the felloe base, said formed part being advantageously constituted by the drop-base of a double felloe (DW felloe), as is disclosed in DE patent application P No. 3,741,640 which is not a prior publication.

BRIEF DESCRIPTION OF THE DRAWINGS

The invention is explained more fully below in relation to the exemplary embodiments shown in the drawing, in which.

DETAILED DESCRIPTION OF THE PREFERRED EMBODIMENT

The track adjustment felloe according to FIGS. 1 to 4, which is constructed as a disc wheel, consists in its main parts of the track adjustment felloe 1 as a support for the pneumatic tyre (not shown), the wheel dish 2 as a connecting part between felloe and wheel hub, and support blocks 3 which serve for the detachable and adjustable connection of the wheel dish 2 to the track adjustment felloe 1.

Figure 1:
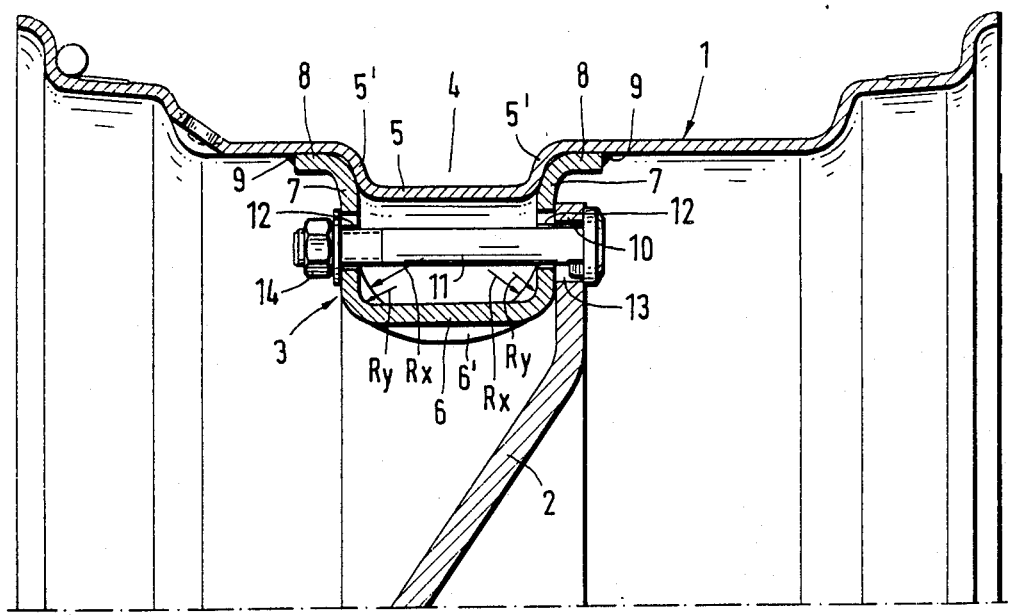
FIG. 1 shows a track adjustment wheel according to the invention provided with support blocks according to the invention in a radial partial section through felloe, support block and wheel dish.

As FIG. 1 shows particularly, the one-part felloe 1 is constructed as a double drop-base felloe (DW felloe), the drop-base 4 of which is delimited by the base portion 5 and the two flanks 5'. In the exemplary embodiment according to FIGS. 1 to 4 the two flanks 5' form lateral contact and bracing surfaces for the support blocks 3.

The support blocks 3 consist of at least approximately U-shaped parts, which are preferably produced as one-part sheet metal pressings. The profile members 7 of the U-shaped support blocks 3, which are connected integrally to the profile bar 6, exhibit at their free member ends outward facing flanges 8, by which the support blocks are fastened internally to the felloe by means of weld seams 9 extending in the circumferential direction of the felloe 1.

Figure 2:
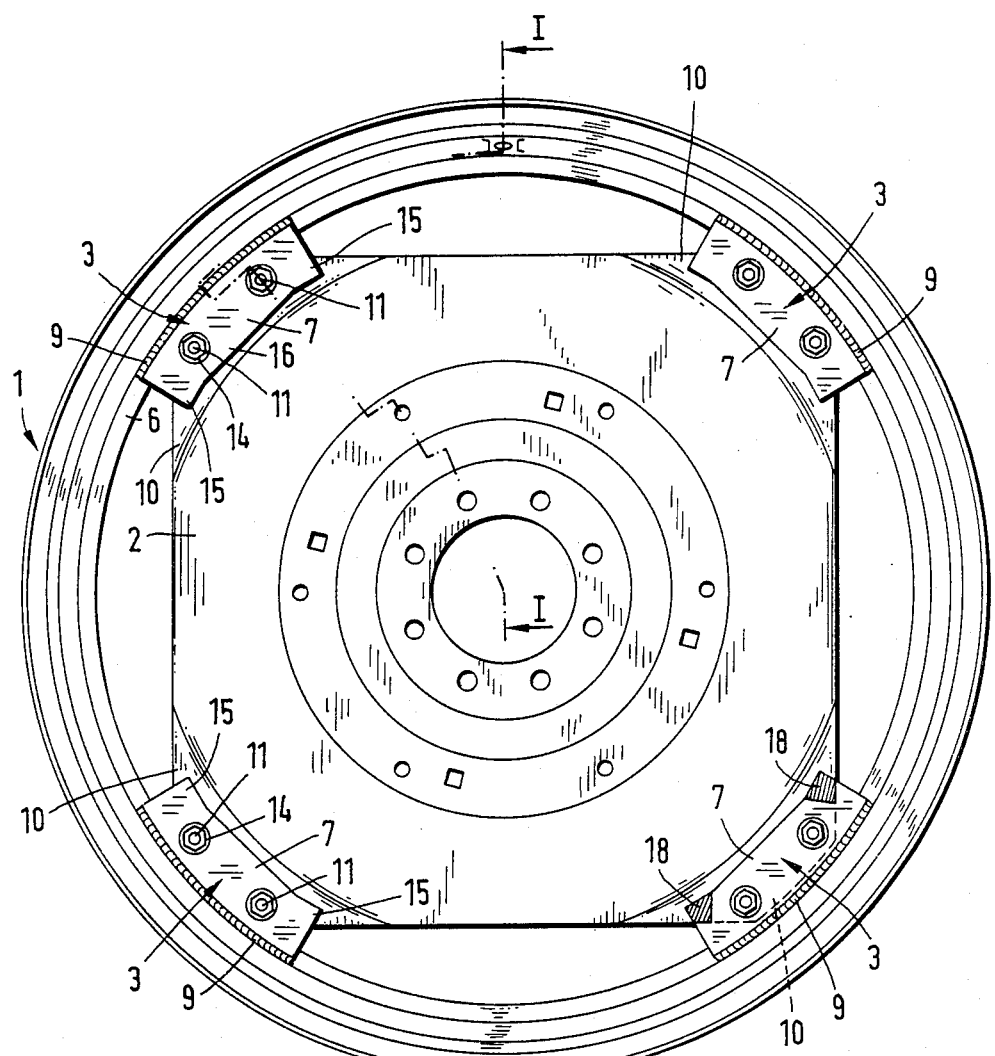
FIG. 2 shows the track adjustment wheel according to FIG. 1 in elevation.

As FIG. 2 shows, four support blocks 3, which are constructed as double support blocks, are arranged distributed round the inner circumference of the track adjustment felloe 1. The wheel dish 2 is accordingly constructed as a four-tab dish which is fastened to the support block 3 by means of two axial screw bolts 11 at each of its dish tabs 10.

As FIG. 1 shows, the arrangement is made in this preferred exemplary embodiment so that the support blocks 3 are braced by their two profile members 7 against the flanks 5' of the drop-base 4. Thus a positive connection of the support blocks 3 to the felloe 1 in the axial direction of the track adjustment wheel is obtained.

The two profile members 7 of the support blocks 3 are provided with bolt holes 12 for the screw bolts 11. The wheel dish 2 accordingly exhibits two bolt holes 13 for penetration by the screw bolts 11 at each of its four dish tabs 10. Nuts engaged on the screw-threaded ends of the screw bolts 11, by means of which the firm screw connections between the track adjustment felloe and the wheel dish are effected, are designated 14.

Figure 3:
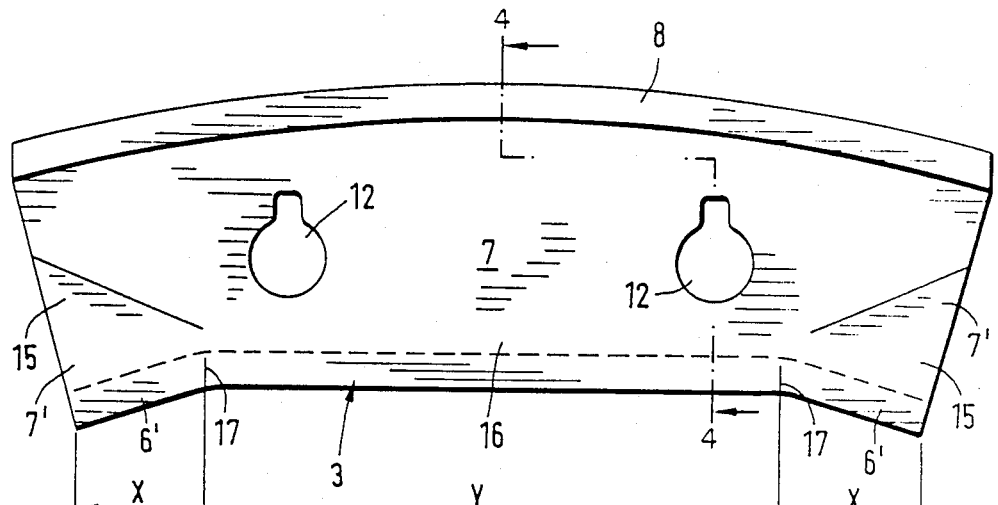
FIG. 3 shows a single support block according to the invention in side elevation on a larger scale.
Figure 4:
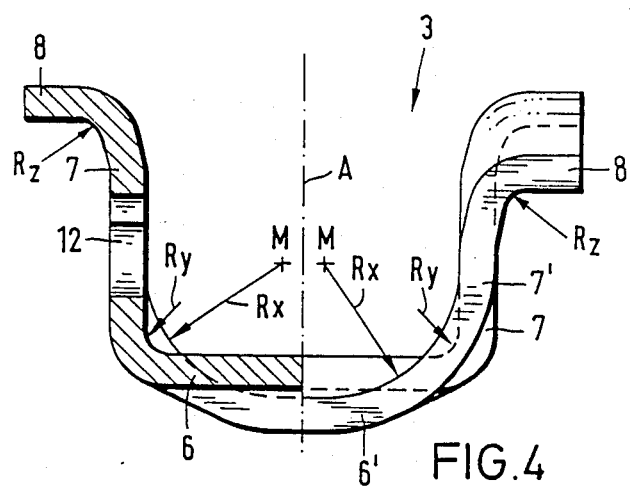
FIG. 4 shows the support block according to FIG. 3 in a section along the line IV—IV of FIG. 3 (left of the vertical central plane) and in an end elevation (right of the vertical central plane)

The configuration of the support blocks 3 is of primary importance. FIGS. 3 and 4 show a single support block 3 which, as stated above, consists of a sheet metal pressing. The support block 3 comprises in one piece the two end regions 15, which, when measured along the profile bar, extend along a length X, and the intermediate section 16 with the length Y. The profile bar 6 of the U-shaped profile is constructed as a flat bar on the intermediate section 16, as shown on the left in FIG. 4. The two profile members 7 are placed here substantially at right angles to the profile bar 6; they merge into the flat bar with the inner radius of curvature Ry. The radius of curvature Ry is comparatively small; it is generally approximately 4-7 mm. The outer surfaces of the profile bars 7 form plane contact surfaces for the wheel dish tabs 10.

In the two end regions 15 of the support block the U-shaped profile is formed by the profile bar 6' and the profile members 7'. As FIG. 4 shows particularly, the profile bar 6' of the U-shaped profile is arched towards the outside of the profile in the two end regions 15 of the support block. At the same time the two profile members 7' are drawn into the inner space of the profile in the curved transition region to the arched profile bar 6' compared to the position of the profile members 7 in the intermediate section 16. This means that in the end regions 15 the profile members 7' merge into the profile bar 6' with inner radii of curvature Rx which are considerably greater than the radii of curvature Ry in the intermediate section 16 of the support block. The arrangement is made so that the radius of curvature Rx increases steadily towards the adjacent end of the support block from the transition 17 (FIG. 3) to the intermediate section 16, so that the bend of the profile bar in the end regions 15 of the support block shown in FIG. 3 results. The inner radius of curvature Rx is conveniently considerably greater, preferably at least approximately four to six times greater, than the radius of curvature Ry in the region of the intermediate section 16. The radius of curvature $R_x$ at the ends of the support block may be at least approximately equal to half the inside width of the profile. In this case the centre of curvature M is located on or in proximity of the vertical central axis A of the U-shaped profile. The length X of the end regions 15 of the support block 3 which are formed in the above manner is conveniently approximately 10-20% of the total length of the support block 3, measured along its profile bar 6, 6'.

As FIG. 3 shows, the holes 12 for the screw bolts 11 are placed outside the formed end regions 15, that is to say on the profile members 7 in the region of the intermediate section 16, namely respectively in proximity of the transition points 17 to the end regions 15. As FIG. 4 shows, the hole axes are located approximately level with the centre M of the radii of curvature Rx.

The configuration of the support block described above ensures that no harmful concentrations of stress can occur particularly in the critical end regions, namely primarily in the region of the radii of curvature Rx and Ry. The increase in the radii of curvature Ry at the transitions between the profile members 7' and the profile bar 6' leads to favourable conditions of contact as regards strength between the wheel dish tabs 10 and the profile members of the support blocks 3. It is thus possible to ensure particularly that no contact with the wheel dish tabs 10 exists in the critical end regions of the support blocks. FIG. 2 indicates by hatching on one of the support blocks 3 the surface areas at 28 in which no dish contact with the profile members 7' exists in the two end regions 15 of the support blocks 3. On the contrary, the wheel dish tabs 10 are braced with large surfaces against the straight profile members 7 in the intermediate section 16, where the fastening screws 11 are also present.

It is recommended to arrange the profile members 7 slightly inclined on the intermediate section 16, so that the inner angle which they enclose with the profile bar 6 constructed as a flat bar exceeds 90° by not more than 0.1°–0.5°. This measure also contributes to achieving favourable load conditions for the block radii $R_x$ and $R_y$ and the flange radii $R_z$ (FIG. 4) at the wheel dish fastening points.

Figure 5:
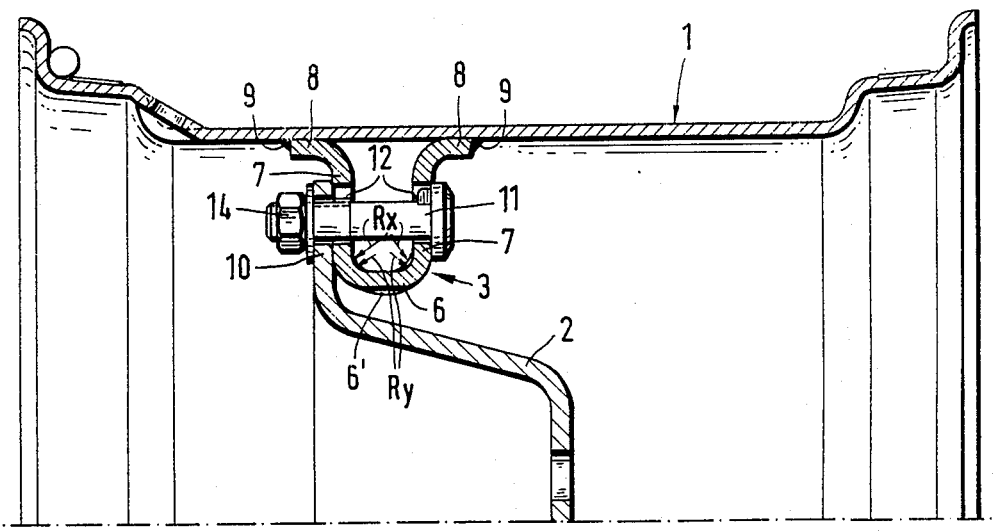
FIG. 5 shows, in a sectional view of FIG. 1, a variant embodiment of the support block and its fastening to the track adjustment felloe.

In the embodiment according to FIG. 5 the support blocks 3 are fastened at their outward facing flanges 8 by the weld seams 9 to the cylindrical inner circumference of the felloe base, without the presence here of any lateral bracing of the profile members 7 against flanks 6 (FIG. 1) of a drop-base 4. Otherwise the support blocks 3 correspond basically to those according to FIGS. 3 and 4. Obviously the connection of the wheel dish to the track adjustment felloe at each support block may also be effected by means of only a single screw 11 or also by means of more than two screws 11. The length of the support block 3 is obviously a function of the number of the screw bolts 11. The arrangement is conveniently made so that the screw bolts 11 are located at the shortest possible radial interval from the felloe base. In case of need, the support blocks 3 produced from sheet metal as U-shaped blocks may also be provided with reinforcing or stiffening means or the like. For example, the two members 7 of the support blocks 3 may be braced and stiffened relative to each other by reinforcing bar or also tubular sections or the like inserted and/or welded in parallel to the bar 6, through which the screws 11 may be inserted. However, the support blocks according to the invention are generally so stable in form that such reinforcing means may be omitted.

What is claimed is:

1. A support block for track adjustable wheels having felloes and wheel dishes, the block comprising:
    two profile members, each having a lower edge and first and second ends; and a profile bar having first and second end regions and an intermediate region, and joining said lower edges of the profile members to form a substantially U-shaped cross-section;
    along the intermediate region, the profile bar and each profile member meet at a first inner radius of curvature;
    in said first and second end regions the profile bar is arched away from the profile members, and the bar has a second inner radius of curvature in said end regions which is greater than said first inner radius of curvature;
    the first and second ends of the profile members being connectable to the felloes.

2. A support block according to claim 1 wherein, at the lower edges, adjacent said end regions of the profile bar, the profile members are curved towards each other whereby the lower edges are closer together adjacent said end regions than in said intermediate region.

3. A support block according to claim 1 wherein said second inner radius of curvature increases steadily along the end regions moving away from the intermediate region.

4. A support block according to claim 1 wherein at said ends said second inner radius of curvature is between 4 and 6 times greater than said first inner radius of curvature.

5. A support block according to claim 1 wherein the support block has a central longitudinal axis, the profile bar has an inner width and wherein the second inner radius of curvature has a center of curvature which is located at said central longitudinal axis and said radius is at least half said inner width.

6. A support block according to claim 1, wherein the end regions have a length which is between 10 and 20% of the length of the support block.

7. A support block according to claim 1, wherein the intermediate section of the profile bar is flat.

8. A support block according to claim 1, wherein the profile members define holes for screw bolts for connection to said wheel dish intermediate the end regions.

9. A support block according to claim 8, wherein each profile member defines a pair of holes in an intermediate region.

10. A support block according to claim 8, wherein said first radius has a center of curvature and each hole has an axis which is approximately level with said center of curvature.

11. A support block according to claim 1, wherein each profile member defines an angle of approximately 90° with the intermediate region of the profile bar.

12. A support block according to claim 1, wherein each profile member defines an angle which differs by 0.1°–0.5° from a right angle with the intermediate region of the profile bar, whereby the profile members converge at their lower edges.

13. A support block according to claim 1, wherein each profile member has an outwardly facing flange at an upper edge.

14. A support block according to claim 1 consisting of a one-part sheet metal pressing.

15. A track adjustable wheel having a wheel axis and a felloe having a felloe base, the felloe base having a drop base, the felloe having attached thereto support blocks each comprising two profile members, each having a lower edge and first and second ends; and a profile bar having first and second end regions and an intermediate region, and joining said lower edges of the profile members to form a substantially U-shaped cross-sections;

along the intermediate region, the profile bar and each profile member meet at a first inner radius of curvature;

in said first and second end regions the profile bar is arched away from the profile members, and the bar has a second inner radius of curvature in said end regions which is greater than said first inner radius of curvature;

the first and second ends of the profile members being attached to the felloe base;

the profile members, in the direction of the wheel axis, abut the drop base.

16. A track adjustable wheel according to claim 15, wherein each support block is attached to the felloe base by a circumferential weld seam.

17. A track adjustable wheel according to claim 15, wherein the drop base of the felloe base has flanks and a base portion and the profile members abut the flanks.

* * * * *